United States Patent [19]

Kaub

[11] Patent Number: 4,942,738

[45] Date of Patent: Jul. 24, 1990

[54] PNEUMATIC BRAKE BOOSTER PISTON WITH SLEEVE DEFINING QUICK-FILL INPUT CHAMBER

[75] Inventor: Manfred Kaub, Rhens, Fed. Rep. of Germany

[73] Assignee: Lucas Industries public limited company, Birmingham, England

[21] Appl. No.: 79,530

[22] Filed: Jul. 30, 1987

[30] Foreign Application Priority Data

Aug. 25, 1986 [DE] Fed. Rep. of Germany ....... 8622758

[51] Int. Cl.$^5$ .................... B60T 13/10; B60T 13/52; B60T 13/56
[52] U.S. Cl. .......................... 60/550; 60/578
[58] Field of Search ............... 92/169.2, 169.4; 60/550, 547.1, 574, 575, 578

[56] References Cited

U.S. PATENT DOCUMENTS

| | | | |
|---|---|---|---|
| 2,458,803 | 1/1949 | Stelzer | 60/550 X |
| 3,937,021 | 2/1976 | Sisco et al. | 60/575 |
| 4,417,445 | 11/1983 | Furuta | 60/578 X |
| 4,446,699 | 5/1984 | Fujii | 91/369 A |
| 4,450,688 | 5/1984 | Boehm | 91/369 A |
| 4,475,444 | 10/1984 | Hendrickson | 92/97 |
| 4,481,865 | 11/1984 | Becht | 91/369 A |
| 4,649,707 | 3/1987 | Belart | 60/550 |
| 4,702,077 | 10/1987 | Lilley et al. | 60/578 |

FOREIGN PATENT DOCUMENTS

| | | | |
|---|---|---|---|
| 2121899 | 1/1984 | United Kingdom | 60/578 |
| 2158532 | 11/1985 | United Kingdom | 60/550 |

Primary Examiner—Robert E. Garrett
Assistant Examiner—George Kapsalas
Attorney, Agent, or Firm—Scrivener and Clarke

[57] ABSTRACT

In a booster casing (12) a movable wall (14) separates two compartments (16,18) from each other. In inoperative position, a control valve (20) connects the two compartments (16,18) with each other, and separates them when in an operative position, connecting one (16) of them to a source of pressure which differs from the pressure in the other compartment (18). A cylinder casing (52) is attached to the booster casing (12), projects into the same, and contains at least one pressure piston (54) which defines a pressure chamber (56) for pressurizing a brake circuit. An input piston (40) having a greater effective surface than the pressure piston (54) and defining an input chamber (42) is movable together with the movable wall (14). The input chamber (42) is adapted to be relieved of pressure by a relief valve (80) if the booster (10) fails. The input piston (40) and chamber (42) are arranged inside the booster casing (12), and the input piston (40) forms part of the movable wall (14). This permits a simple design of the assembly which is particularly space-saving, with a given specification of its performance.

14 Claims, 1 Drawing Sheet

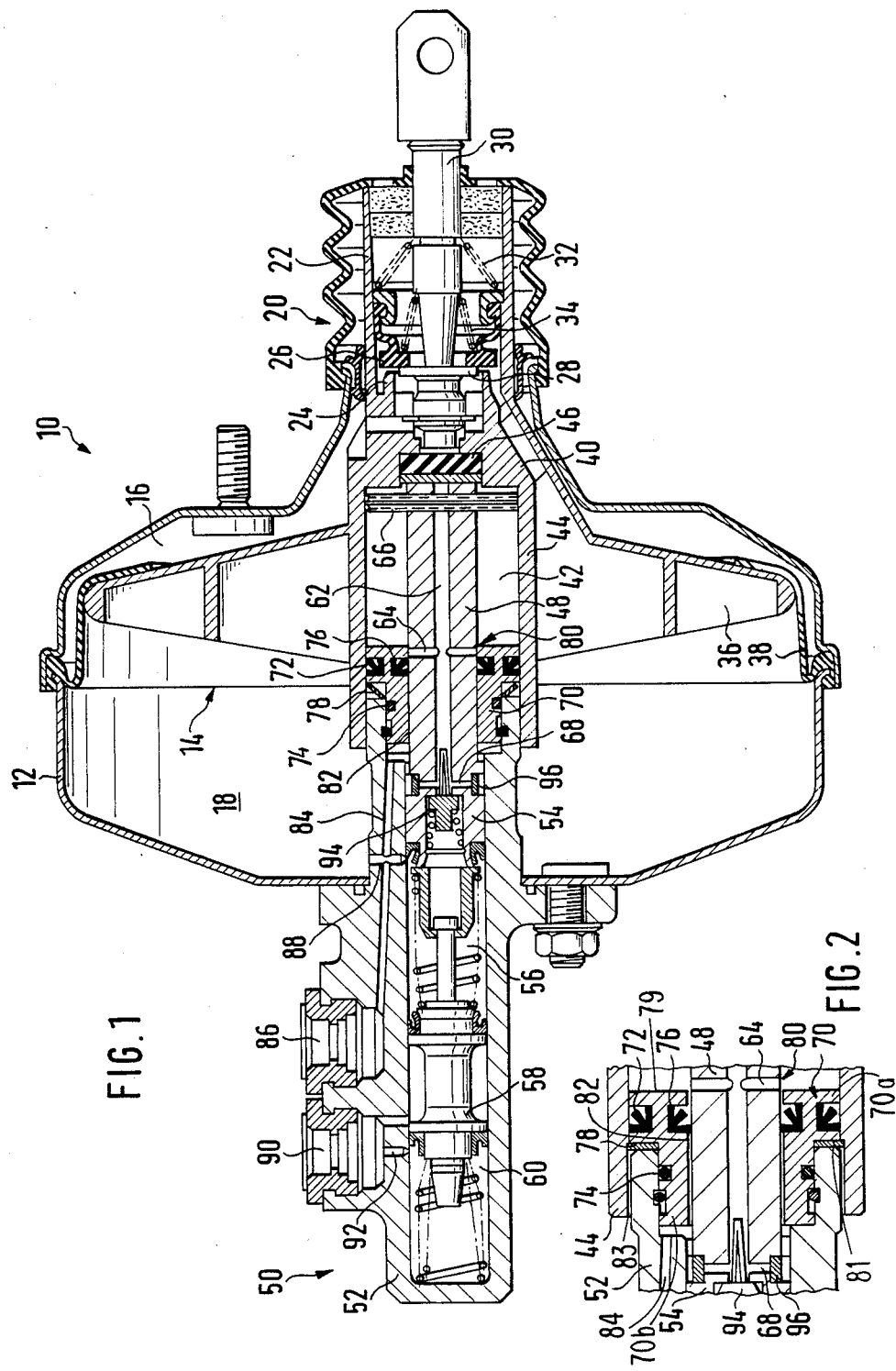

PNEUMATIC BRAKE BOOSTER PISTON WITH SLEEVE DEFINING QUICK-FILL INPUT CHAMBER

BACKGROUND OF THE INVENTION

1. Field of the Invention

The invention relates to a brake pressure booster and master cylinder assembly, comprising a booster casing in which a movable wall separates two compartment from each other, a control valve which connects the two compartments with each other when it is in an inoperative position and separates them when in an operative position, connecting one of them to a source of pressure which differs from the pressure in the other compartment, a cylinder casing attached to the booster casing, projecting into the same, and containing at least one pressure piston which defines a pressure chamber for pressurizing a brake circuit, an input piston which has a larger effective surface than the pressure piston, defines an input chamber, and is movable together with the movable wall, and a relief valve adapted to relieve the input chamber of pressure in case of failure of the brake pressure booster.

2. Description of the Prior Art

In a known assembly of this kind (DE-A-2 460 529) the cylinder casing is flanged to the booster casing by a flange formed at one end of the cylinder casing, and it comprises a short end portion which is centered in the booster casing. Primary and secondary pressure chambers are formed axially behind each other in the cylinder casing and each defined by a pressure piston. A brake circuit of a motor vehicle is adapted to be connected to each pressure chamber. An input chamber is formed between the primary pressure chamber and the end of the cylinder casing fastened to the booster casing, the diameter of the input chamber is greater than that of the primary pressure chamber. The input chamber contains an input piston connected to the movable wall in the booster casing by a push rod. The input chamber communicates with a connection for a pressure fluid reservoir through a relief valve which normally is kept closed by vacuum prevailing in the booster casing when the booster is ready for operation. Upon actuation of the brake, the pressure rod moves the input piston which thus displaces brake fluid in the input chamber, the brake fluid in turn advancing the pressure piston at the primary end. The distance by which this pressure piston is moved forward is greater than the distance travelled by the input piston at the ratio of the effective surfaces of the input piston and the pressure piston. Therefore, there is a stroke ratio between the input piston and the pressure piston at the primary end when the brake pressure booster is intact and the relief valve consequently is closed. The pressure piston at the secondary end has an effective surface of the same size as the pressure piston at the primary end and, therefore, is moved by the same distance as this piston. If the brake pressure booster should fail, the relief valve opens so that actuation of the brake will cause brake fluid displaced by the input piston to flow off into the pressure fluid reservoir without any increase in pressure taking place in the input chamber. The input piston is formed with an axial extension by which it directly pushes the pressure piston at the primary end so that this piston will be moved only by the same distance as the input piston. In case of failure of the booster, therefore, the actuating force required for the joint displacement of the input piston and the pressure piston at the primary end no longer is determined by the effective surface of the input piston but instead by the smaller surface of the pressure piston at the primary end.

Another known master cylinder assembly (US-A-4 086 770) comprises a cylinder casing which is likewise suited for attachment to a brake pressure booster and comprises two pressure pistons in tandem arrangement and an input piston connected upstream of the pressure piston at the primary end. The input piston again has a larger effective surface than the pressure piston at the primary end. However it is formed in one piece with the same so that both of them can only move together. Upon actuation of the brake, the input piston displaces a larger volume than released by the pressure piston. Consequently brake fluid flows from the input chamber past a lip seal of the pressure piston at the primary end into the associated pressure chamber whereby the brake circuit connected to the same is filled rapidly. When the pressure in the pressure chamber at the primary end exceeds a certain value, a relief valve opens to establish communication between the input chamber and a pressure fluid reservoir whereby the input chamber is relieved of pressure and the further power needed to actuate the brake is determined only by the effective surface of the pressure piston at the primary end.

Both known assemblies described above are of great structural length, as measured from the rear end of the booster casing to the front end of the cylinder casing. Mass forces of inertia resulting from vibrations and acting on the cylinder casing and the structural members it houses as well as on the pressure fluid reservoir attached to the same may cause great bending moments in the area of the connection between the cylinder casing and the booster casing so that the entire booster casing must be given a sturdy structure as it usually presents the only connection between the cylinder casing and the supporting portion of the associated vehicle.

SUMMARY OF THE INVENTION

It is, therefore, an object of the invention to design a brake pressure booster and master cylinder assembly of simpler, lighter, space-saving structure for a given specification of its performance.

This object is met, in accordance with the invention, in a brake pressure booster and master cylinder assembly, in that the input piston and the output chamber are disposed within the booster casing, and the input piston forms part of the movable wall.

This solution in accordance with the invention is advantageous, irrespective of whether the input piston serves to establish a stroke ratio, in agreement with DE-A-2 460 529 or is provided as a quick-fill piston, in accordance with U.S. Pat. No. 4 086 770.

The feature of the input piston and the input chamber being arranged inside the booster casing is provided also in the applicant's European patent applications 86 103 000.5 and 86 103 001.3 which are not prior publications. In those cases, however, the input piston is a structural member separate from the movable wall.

The invention preferably is developed further in that the input piston is formed integral with a support member of the movable wall which member is connected to the booster casing by a diaphragm. In this manner the number of individual components of the assembly according to the invention is reduced and its manufacture simplified accordingly.

For the same reasons it is advantageous to form the input piston in one piece with a sleeve-like outer envelope of the input chamber.

In that context it is advantageous if the sleeve-like envelope encloses an intermediate piston by a first seal, said piston further being enclosed by the cylinder casing by means of a second seal.

This embodiment preferably is developed further in that the intermediate piston is supported in the cylinder casing by a spring tending to move it in the direction of the input piston, a space defined by the intermediate piston between the first and second seals is connected to one of the compartments which is under lower pressure than the other compartment when the brake pressure booster is intact, whereby the spring is overcome, and the intermediate piston controls the relief valve such that it will open sooner, in the course of brake actuation, if the brake pressure booster has failed than if it is intact.

This embodiment may be modified further in that the intermediate piston encloses the pressure piston by a third seal and the relief valve is formed by this third seal in combination with a passage formed in the pressure piston.

In accordance with another feature of the invention the input chamber communicates with the pressure chamber through a check valve for quick filling of the associated brake circuit.

Furthermore, it is advantageous if the input chamber is connected by an additional relief valve which is independent of the state of the brake pressure booster to a connection for a pressure fluid reservoir. This valve limits the maximum pressure which may build up in the input chamber, thereby preventing that the actuation of the brake becomes unnecessarily difficult by an excessive pressure build-up in the input chamber.

The input piston, furthermore, may contain an elastomer body as a power transmitter between an actuating member and the pressure piston. Such elastomeric members are customary in brake pressure boosters. What is novel is their space saving arrangement in the input piston.

The number of components of the assembly according to the invention may be reduced still further by forming the input piston integral with a valve seat and a valve casing of the control valve.

BRIEF DESCRIPTION OF THE DRAWINGS

The invention will be described further, by way of example, with reference to the accompanying drawings, in which:

FIG. 1 is an axial sectional elevation of a brake pressure booster and master cylinder assembly in an inoperative state, with the booster not being ready for operation;

FIG. 2 is a somewhat enlarged part section of FIG. 1 likewise in inoperative state, yet with the booster ready for operation.

DETAILED DESCRIPTION OF THE PREFERRED EMBODIMENT

The brake pressure booster and master cylinder assembly shown comprises a brake pressure booster 10 with a two-part booster casing 12 which is intended to be attached to the dashboard of a motor vehicle and has its interior separated by a movable wall 14 into two compartments 16 and 18.

The booster 10 further comprises a control valve 20 which has a tubular valve casing 22 formed integral with an outer annular valve seat 24. A valve closing member 26 likewise of annular shape is associated with the valve seat and is axially displaceable with respect to the valve casing 22, while it is sealed with respect to the valve casing. It cooperates with an internal valve seat 28 formed at a rod-like actuating member 30. The actuating member 30 may be connected in articulated fashion to a brake pedal and is biased into its inoperative position, to the right in FIG. 1, by a spring 32 supported in the valve casing 22. Another spring 34 supported on the actuating member 30 presses the valve closing member 26 in the direction of the two valve seats 24 and 28.

In the inoperative position illustrated, the valve closing member 26 is held in abutment against the internal valve seat 28, while the latter assumes a position in which it prevents the valve closing member 26 from engaging the outer valve seat 24 as well. Therefore, a connection between the two compartments 16 and 18 controlled by the outer valve seat 24 is open, while a connection controlled by the inner valve seat 28 between atmosphere and the compartment 16 is closed. The compartment 18 is connected to a source of vacuum, such as the intake manifold of a combustion engine. The vacuum produced there prevails in both compartments 16 and 18 when the control valve 20 is at rest in the position shown.

Components of the movable wall 14 are a support member 36 formed integral with the valve casing 22 and a diaphragm 38 which establishes a sealed connection between the supporting member 36 and the booster casing 12. The brake pressure booster 10 is of conventional design as far as it was described above.

In accordance with the invention the movable wall 14 comprises another component, namely an input piston 40 formed integral with the support member 36 and the valve casing 22 and defining an input chamber 42 to the rear, i.e. to the right in FIG. 1. The input chamber 42 is defined radially outwardly by a sleeve-like envelope 44 which likewise is formed integral with the support member 36. The input piston 40 is formed with a central recess in which an elastomer body 46 is embedded which is engaged from the rear by a small front end surface of the actuating member 30 and from the front by a greater rear end surface of a push rod 48 so that the elastomer body 46 is enclosed all around, acting in per se known manner as a power transmitter.

A master cylinder 50 for a dual circuit brake system is associated with the brake pressure booster 10. The master cylinder 50 has a cylinder casing 52 arranged coaxially with the booster casing 12 to the front end of which it is connected. A considerable portion of the master cylinder 50, in the embodiment shown approximately one third of the total length thereof is disposed inside the brake pressure booster 10. In the cylinder casing 52 a primary pressure piston 54 defines a primary pressure chamber 56 to which a first brake circuit may be connected. A secondary pressure piston 58 defines a secondary pressure chamber 60 to which a second brake circuit is adapted to be connected.

Both pressure pistons 54 and 58 have the same diameter which is much smaller than the inner diameter of the sleeve-like envelope 44 of the input chamber 42. The primary pressure piston 54 is formed in one piece with the push rod 58, an axial bore 62 extending through both of them. A central diametral passage 64 and a rear diametral passage 66 as well as a front diametral passage 68 cross the bore which is permanently connected to the input chamber 42 by way of the rear diametral passage 66 formed by a slotted spring cage.

An annular intermediate piston 70 is disposed between the input piston 40 and the primary pressure piston 54 and includes a first part 70a which is slideably received in the sleeve-like envelope 44 and is sealed thereto by a first seal 72. The intermediate piston 70 includes a second part 70b of lesser diameter than said first part and which is slideably received in an enlarged inside wall portion of the cylinder casing 52 and is sealed thereto by a second seal 74. The intermediate piston is slideably received on the cylindrical outer surface of the push rod 48 and is sealed thereto by a third seal 76. A spring 78, shown as a plate spring, is positioned between the rear end surface of the cylinder casing 52 and the first part 70a of the intermediate piston 70. This spring tends to push the intermediate piston 70 away from the cylinder casing 52 in the direction of the input piston 40.

The intermediate piston 70 has a first face 79 (FIG. 2) exposed to the pressure in the input chamber 42 and a second face 81 opposed to the first face 79 and defining one wall of the space in which the spring 78 is mounted which space is permanently connected by passage 83 (FIG. 2) to the compartment 18 of the back pressure booster 10. For this reason low pressure prevails in this space as well when the brake pressure booster is ready for operation. The effective diameter of the first seal 72 is greater than that of the second seal 74 by so much that brake fluid filling the input chamber 42 and being under atmospheric pressure, when the booster 10 is ready to operate, presses the intermediate piston 70 against the rear end surface, as seen in FIG. 2, of the cylinder casing 52. During this time, the third seal 76 is located at a relatively great axial distance in front of the middle diametral passage 64 so that the latter opens into the input chamber 42. If, however, there should be a leak in the booster casing 12 or the diaphragm 38 or if atmospheric pressure or insufficient low pressure should prevail during standstill of the combustion engine in the compartment 18 to which the engine is connected, the spring 78 assures that the third seal 76 will be positioned above the middle diametral passage 64 or just in front of the same, as shown in FIG. 1.

Together with the third seal 76 the central diametral passage 64 constitutes a relief valve 80 which makes it possible for a very small movement of the push rod 48 in forward direction to be sufficient to establish communication between the middle diametral passage 64 and a paraxial passage 82 formed at the inside of the intermediate piston 70 in front of the third seal 76 upon actuation of the brake when the low pressure in the front compartment 18 has failed. The passage 82 communicates permanently through a bore 84 formed in the cylinder casing 52 with a primary connection 86 for a pressure fluid reservoir (not shown). The bore 84 communicates in addition through a radial bore 88 in the cylinder casing 52 with the primary pressure chamber 56 as long as the primary pressure piston 54 is at rest in the position shown in FIG. 1.

The cylinder casing 52 further comprises a secondary connection 90 for the pressure fluid reservoir. This connection communicates through a radial bore 92 with the secondary pressure chamber 60 as long as the secondary pressure piston 58 is at rest in the position shown.

A check valve 94 is arranged in the primary pressure piston 54 at the front end of the axial bore 62. This valve permits pressure fluid to flow as long as the pressure in the primary pressure chamber 56 is lower than that in the input chamber 42.

An additional relief valve 96 likewise embodied by a check valve is associated with the front diametral passage 68 to permit brake fluid to flow off from the input chamber 42 through the bore 84 into the pressure fluid reservoir when the pressure in the input chamber 42 exceeds a certain value, regardless of whether the brake pressure booster 10 is intact or not.

Actuation of the brake pressure booster and master cylinder assembly shown, with the booster 10 intact, by displacing the actuating member 30 in forward direction by means of the associated brake pedal will cause the valve closing member 26 to abut against the outer valve seat 24 so as to interrupt the connection between the two compartments 16 and 18 in which the same low pressure has prevailed up to now. Further forward movement of the actuating member 30 immediately afterwards causes the inner valve seat 28 to be lifted off the valve closing member 26, whereby air may flow from behind through the valve casing 22 into the rear compartment 16, while the low pressure in the front compartment 18 is maintained. The resulting differential pressure displaces the movable wall 14 to the front so that the input piston 40 pushes the push rod 48 together with the primary pressure piston 54 in forward direction. Hereby the brake fluid in the input chamber 42 is pressurized. The intermediate piston 70 cannot yield to this pressure because, with the booster 10 intact, as shown in FIG. 2, it already is in its front terminal position.

In short time, therefore, a great quantity of brake fluid will flow from the input chamber 42 through the check valve 94 into the primary pressure chamber 56 so that the brake circuit connected to the same is filled rapidly and also the secondary pressure piston 58 is advanced, whereby the brake circuit connected to the secondary pressure chamber 60 likewise is filled quickly. The rising pressure in the input chamber 42 permits the relief valve 96 which is embodied by a check valve to open. For this reason the pressure fluid reservoir will take up excess pressure fluid from the input chamber 42 so that high pressure cannot build up in the same which would unnecessarily increase the force required. Immediately afterwards the pressure gradient between the primary pressure chamber 56 and the input chamber 42 causes the closing of the check valve 94.

Now, if the brake is actuated upon failure of the brake pressure booster 10 so that consequently the intermediate piston 70 will be located in the position shown in FIG. 1, forward movement of the push rod 48 caused by the actuating member 30 alone without the support of the booster 10 and hardly noticeable by the driver, if at all, is sufficient to open the relief valve 80 so that brake fluid will flow off from the input chamber 42 through the rear diametral passage 66, the axial bore 62, the middle diametral passage 64, the paraxial passage 82, the bore 84 and the connection 86 into the pressure fluid reservoir. For this reason no pressure increase worth mentioning takes place in the input chamber 42. Therefore, all the force the driver must apply is that resulting from the effective surface of the primary pressure piston 54 and the slowly rising pressure in the two brake circuits. Yet the distance which the pedal must travel to fill the brake circuits is greater than when the brake pressure booster is intact because the failure thereof also abolishes the quick filling function of the input piston 40.

What is claimed is:

1. A brake pressure booster and master cylinder assembly, comprising
   a booster casing (12) in which a movable wall (14) separates two compartments (16, 18) from each other,
   control valve (20) which connects the two compartments (16, 18) with each other when it is in an inoperative position and separates the two compartments (16,18) from each other when in an operative position, connecting one (16) of them to a source of pressure which differs from the pressure in the other compartment (18),
   a cylinder casing (52) attached to the booster casing (12), projecting into the same, and containing at least one pressure piston (54) which defines a pressure chamber (56) for pressurizing a brake circuit,
   an input piston (40) which has a larger effective surface than the pressure piston (54), defines an input chamber (42), and is movable together with the movable wall (14) to pressurize said input chamber (42) during normal operation of said brake pressure booster, and
   a relief valve (80) adapted to relieve the input chamber (42) of pressure in case of failure of the brake pressure booster (10),
   said input piston (40) and the input chamber (42) being disposed within the booster casing (12),
   said input piston (40) forming part of the movable wall (14) and including an integral sleeve-like outer envelope (44) of the input chamber (42), said sleeve-like envelope (44) enclosing an intermediate piston (70) by a first seal (72), said piston (70) further being enclosed by the cylinder casing (52) by means of a second seal (74).

2. The assembly as claimed in claim 1, characterized in that the input piston (40) is formed integral with a support member (36) of the movable wall (14) which member is connected to the booster casing (12) by a diaphragm (38).

3. The assembly as claimed in claim 1, wherein
   the intermediate piston (70) is supported in the cylinder casing (52) by a spring (78) tending to move it in the direction of the input piston (40),
   a space defined by the intermediate piston (70) between the first and second seals (72, 74) is connected to one of the compartments (18) which is under lower pressure than the other compartment (16) when the brake pressure booster (10) is intact, whereby the spring (78) is overcome, and
   the intermediate piston (70) controls the relief valve (80) such that it will open sooner, in the course of brake actuation, if the brake pressure booster (10) has failed than if it is intact.

4. The assembly as claimed in claim 3, wherein the intermediate piston (70) encloses the pressure piston (54) by a third seal (76) and the relief valve (80) is formed by this third seal (76) in combination with a passage (64) formed in the pressure piston (54).

5. The assembly as claimed in claim 1 or 2 wherein the input chamber (42) communicates with the pressure chamber (56) through a check valve (94) for quick filling of the associated brake circuit.

6. The assembly as claimed in claim 1 or 2 wherein the input chamber (42) is connected by an additional relief valve (96) which is independent of the state of the brake pressure booster (10) to a connection (86) for a pressure fluid reservoir.

7. The assembly as claimed in claim 1 or 2 wherein the input piston (40) contains an elastomer body (46) as a power transmitter between an actuating member (30) and the pressure piston (54).

8. The assembly as claimed in claim 1 or 2 wherein the input piston (40) is formed integral with a valve seat (24) and a valve casing (22) of the control valve (20).

9. A brake pressure booster and master cylinder assembly, comprising:
   a booster casing (12) in which a movable wall (14) separates two compartments (16,18) from each other,
   a control valve (20) which connects the two compartments (16,18) with each other when it is in an inoperative position and separates the two compartments (16,18) from each other when in an operative position, connecting one (16) of them to a source of pressure which differs from the pressure in the other compartment (18),
   a cylinder casing (52) attached to the booster casing (12), projecting into the same, and containing at least one pressure piston (54) which defines a pressure chamber (56) for pressurizing a brake circuit,
   an input piston (40) which has a larger effective surface than said pressure piston (54) and is formed with an integral, sleeve-like envelope (44) defining an input chamber (42) movable together with the movable wall, a relief valve (80) adapted to relieve the input chamber (42) of pressure in case of failure of the brake pressure booster (10), an intermediate piston (70) disposed between said input piston (40) and said pressure piston (54) and including a first part (70a) which is slideably received in said sleeve-like envelope and is sealed thereto by a first seal (72), said intermediate piston (70) having a second part (70b) which is slideably received in said cylinder casing (52) and is sealed thereto by a second seal (74), a spring (78) acting on said intermediate piston (70) urging it to a first position in the direction of said input piston (40), said intermediate piston having a first face (79) exposed to the pressure in said input chamber (42) and an opposed second face (81) exposed to pressure in a space between said first and second seals (72,74), fluid passage means (83) connecting said space to the one of said booster compartments (18) which is under lower pressure than the other compartment (16) when the brake pressure booster (10) is actuated, said intermediate piston (70) being responsive to predetermined differences in relative pressure forces acting on the respective first and second faces (79, 81) to effect movement of said intermediate piston (70) between first and second positions towards and away from said input piston (40), respectively, said intermediate piston (70) having an operative connection with said relief valve (80) whereby said relief valve (80) is opened sooner, in the course of brake actuation if the booster has failed than if it is operative.

10. The assembly as claimed in claim 11, wherein said pressure piston includes a cylindrical extension (48) projecting into said input chamber (42) and having passages (62,64) therein, said intermediate piston (70) being slideably received on said extension (48) and being sealed thereto by a third seal (76), said relief valve (80) being defined by said third seal (76) in combination with said fluid passage (62,64), said third seal (76) in the first position of said intermediate piston (70) enabling said fluid passage (62,64) to be opened to connect said input chamber (42) to relief (86) sooner than when said intermediate piston (70) is in its second position.

11. The assembly as claimed in claim 9, wherein said input chamber (42) communicates with the pressure chamber (56) through a check valve (94) for quick filling of the associated brake circuit.

12. The assembly as claimed in claim 9, wherein the input chamber (42) is connected by an additional relief valve (96) which is independent of the state of the brake pressure booster (10) to a connection (86) for a pressure fluid reservoir.

13. The assembly as claimed in claim 9, wherein the input piston (40) contains an elastomer body (46) as a power transmitter between an actuating member (30) and the pressure piston (54).

14. The assembly as claimed in claim 9, wherein the input piston (40) is formed integral with a valve seat (24) and a valve casing (22) of the control valve (20).

* * * * *